United States Patent
Gao et al.

(10) Patent No.: US 11,689,737 B1
(45) Date of Patent: Jun. 27, 2023

(54) PLANE CODING TARGET AND IMAGE SPLICING SYSTEM AND METHOD APPLYING THE SAME

(71) Applicant: GUANGDONG UNIVERSITY OF TECHNOLOGY, Guangzhou (CN)

(72) Inventors: Jian Gao, Guangzhou (CN); Yuanyang Wei, Guangzhou (CN); Lanyu Zhang, Guangzhou (CN); Haixiang Deng, Guangzhou (CN); Yun Chen, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/065,530

(22) Filed: Dec. 13, 2022

(30) Foreign Application Priority Data

Dec. 31, 2021 (CN) .......................... 202111676920.1

(51) Int. Cl.
*H04N 7/12* (2006.01)
*H04N 19/513* (2014.01)
*H04N 19/172* (2014.01)

(52) U.S. Cl.
CPC ......... *H04N 19/513* (2014.11); *H04N 19/172* (2014.11)

(58) Field of Classification Search
CPC .......................... H04N 19/513; H04N 19/172
See application file for complete search history.

(56) References Cited

U.S. PATENT DOCUMENTS

| | | | | |
|---|---|---|---|---|
| 4,938,654 A * | 7/1990 | Schram | ............... | G02B 21/0016 414/757 |
| 5,917,989 A * | 6/1999 | DuCatte, Jr. | .......... | G11B 27/034 386/280 |
| 2013/0030304 A1* | 1/2013 | Chung-Ming | ........ | G01J 5/0025 600/473 |
| 2016/0144977 A1* | 5/2016 | Way | ....................... | H04N 23/58 348/38 |

FOREIGN PATENT DOCUMENTS

| | | |
|---|---|---|
| CN | 102944191 A | 2/2013 |
| CN | 110763204 A | 2/2020 |
| CN | 113096191 A | 7/2021 |
| CN | 113129385 A | 7/2021 |
| CN | 113160329 A | 7/2021 |
| JP | 2014072854 A | 4/2014 |

* cited by examiner

*Primary Examiner* — Gims S Philippe

(57) ABSTRACT

Disclosed are a plane coding target and an image splicing system and method applying the same. The plane coding target comprises a plurality of coding units distributed in an array, the coding unit comprises one central coding point, a plurality of normal coding points and at least one positioning point, and a positioning point distribution style of the positioning point is used for determining coordinates of the central coding point and the normal coding points in a coding unit coordinate system; and coding numerical value sequences of the coding units are different from each other and unique. The plane coding target can realize large-area coding and positioning functions, and the image splicing system applying the plane coding target can solve the problems of splicing error and error accumulation caused by an identification error of a splicing location, thus realizing large-range, high-precision and short-time two-dimensional image splicing.

10 Claims, 10 Drawing Sheets

PLANE CODING TARGET AND IMAGE SPLICING SYSTEM AND METHOD APPLYING THE SAME

CROSS REFERENCE TO RELATED APPLICATIONS

This application claims foreign priority of Chinese Patent Application No. 202111676920.1, filed on Dec. 31, 2021 in the China National Intellectual Property Administration, the disclosures of all of which are hereby incorporated by reference.

TECHNICAL FIELD

The present invention relates to the field of computer vision technologies, and particularly to a plane coding target and an image splicing system and method applying the same.

BACKGROUND

In the field of computer vision, a visual target is widely applied in visual calibration, object pose measurement, visual navigation and other occasions. At present, common visual targets are classified into a plane target and a stereoscopic target: the stereoscopic target is mostly used in calibration and measurement of a three-dimensional visual system, and the stereoscopic target has a high manufacturing requirement and a complicated solving process and is difficult to realize large-scale real-time measurement; while the plane coding target can realize a wide-range measurement requirement while taking into account a measurement accuracy. At present, coding targets mainly comprise a circular coding target, a point distribution coding target, a color coding target, etc., wherein the circular coding target codes information on a circular coding strip, and the coded information has a small capacity; the point distribution coding target codes by a topological relationship among a group of points, and coding rules of different groups are different, resulting in a poor universality; and the color coding target adds color information, which not only increases a coding capacity but also increases identification complexity and algorithm time-consumption. The coding targets above cannot take into account the advantages of wide range, high accuracy and high reliability, so that it is of great significance to design a coding target capable of meeting a wide-range detection requirement and realizing high measurement accuracy and high reliability.

Moreover, traditional image splicing methods mainly comprise a frequency domain method such as a phase correlation method using a Fourier transform and a time domain method such as feature point-based description and matching, wherein the phase correlation method using the Fourier transform is based on a displacement theorem of Fourier transform: a Fourier transform of a translated function is only a product of a Fourier transform of an untranslated function and an exponential factor with a linear phase, which means that translation in a spatial domain may cause a phase shift of a frequency spectrum in a frequency domain, so that an image may be regarded as a discrete two-dimensional function to solve transformation parameters and complete splicing.

A main process of the feature point-based description and matching comprises: 1) extracting feature points; 2) describing the feature points to generate descriptors; 3) matching according to descriptors of feature points in a spliced image and an image to be spliced, wherein a pair of feature points having descriptors with a closest Euclidean distance in left and right images is generally used as a matching pair; and 4) eliminating a mismatched feature point pair: iterating by random consistency according a registration model, eliminating a wrong point pair, and extracting a point pair satisfying the model within a certain small error range; and taking parameters of optimum registration model for iteration as final registration parameters for splicing.

A splicing accuracy of the methods above mainly depends on an algorithm itself, and errors are easy to accumulate in a process of wide-range splicing, leading to some problems such as splicing dislocation.

SUMMARY

A first objective of the present invention lies in providing a plane coding target, which can realize large-area coding and positioning functions to overcome the defects in the prior art.

A second objective of the present invention lies in providing an image splicing system applying the plane coding target, which can solve the problems of splicing error and error accumulation caused by an identification error of a splicing location, thus realizing large-range, high-precision and short-time two-dimensional image splicing.

A third objective of the present invention lies in providing an image splicing method applying the plane coding target, which can solve the problems of splicing error and error accumulation caused by an identification error of a splicing location, thus realizing large-range, high-precision and short-time two-dimensional image splicing.

In order to achieve the objectives, a technical solution used in the present invention is as follows.

A plane coding target comprises a plurality of coding units distributed in an array, the coding unit comprises one central coding point, a plurality of normal coding points and at least one positioning point, a circular coded region of the coding unit is constructed by taking the central coding point as a center of circle and R as a construction radius, and the normal coding points are located in an interior or at an edge of the circular coded region;

the central coding point and any two normal coding points adjacent to the central coding point form a positioned region, any three adjacent normal coding points form a coded sub-region, the coded sub-region and the positioned region are equilateral triangles with equal areas, the positioning point is located in the positioned region, and only one positioning point is allowed to exist in each positioned region; and when the coding unit has only one positioning point, the positioning point is incapable of being located at a center-of-gravity location of the positioned region;

a coding unit coordinate system of the coding unit takes the central coding point as an original point, a direction towards one of the normal coding points adjacent to the central coding point is an X axis, and a direction perpendicular to the X axis is a Y axis; the central coding point and the normal coding point are both provided with a coding point pattern, different coding point patterns are arranged on the central coding point and the normal coding point for coding, the coding point patterns have mutually different and unique coding numerical values, and the central coding point and the normal coding point both have mutually different and unique coding serial numbers; a positioning point distribution style of the positioning point is used for determining coordinates of the central coding point and the normal coding point in the coding unit coordinate system; and the coding unit sequentially acquires the coding numerical values of the coding point patterns on the central coding point and the normal coding point according to the coding point serial numbers, and generates a coding numerical value sequence of the coding unit, and the coding units have mutually different and unique coding numerical value sequences.

Preferably, a two-dimensional image splicing system for the plane coding target comprises a data processing device, a first image acquisition device, a second image acquisition device, an acquisition device connecting bracket, a first XY motion platform, the plane coding target, a coding target fixing base, a second XY motion platform and a measured object fixing base, wherein: the first image acquisition device is connected with the second image acquisition device through the acquisition device connecting bracket, the acquisition device connecting bracket is connected with the first XY motion platform, the first XY motion platform drives the acquisition device connecting bracket to move, and the first image acquisition device and the second image acquisition device are respectively in communication connection with the data processing device through a data transmission line;

the plane coding target covers an upper surface of the whole coding target fixing base, an upper surface of the measured object fixing base is used for placing and fixing a measured object, the coding target fixing base and the measured object fixing base are both fixed on the second XY motion platform, the second XY motion platform drives the coding target fixing base and the measured object fixing base to move synchronously, and the second XY motion platform is located below the first XY motion platform;

an optical axis direction of the first image acquisition device is parallel to an optical axis direction of the second image acquisition device, the optical axis direction of the first image acquisition device vertically points to the upper surface of the coding target fixing base, and the optical axis direction of the second image acquisition device vertically points to the upper surface of the measured object fixing base; a motion plane of the first XY motion platform is perpendicular to the optical axis direction of the first image acquisition device; and a motion plane of the second XY motion platform, the motion plane of the first XY motion platform, the upper surface of the coding target fixing base and the upper surface of the measured object fixing base are parallel to each other.

Preferably, a splicing method of the two-dimensional image splicing system for the plane coding target comprises the following steps:

a target generation step: generating the corresponding plane coding target according to a measurement occasion requirement, and arranging the plane coding target on the upper surface of the coding target fixing base by the data processing device;

a coordinate system establishment step: respectively establishing a second XY motion platform coordinate system $O_p$-$X_pY_p$ of the second XY motion platform, a first XY motion platform coordinate system $O'_p$-$X'_pY'_p$ of the first XY motion platform, a plane coding target coordinate system $O_t$-$X_tY_t$ of the plane coding target, a first image coordinate system $O$-$U_1V_1$ of a first image acquired by the first image acquisition device and a second image coordinate system $O$-$U_2V_2$ of a second image acquired by the second image acquisition device, and storing a spliced image coordinate system needed for image splicing by the data processing device;

a splicing original point setting step: moving a field of view of the first image acquisition device to a lower left corner region of the plane coding target through motions of the first XY motion platform and the second XY motion platform, then triggering the first image acquisition device and the second image acquisition device to acquire images at the same time, wherein a first sheet of first image and a first sheet of second image acquired form an image pair acquired for the Pt time, and the first image needs to contain a pattern of at least one coding unit, then calculating coordinates $(x'_0, y'_0)$ of an image center of the first image in the image pair acquired for the Pt time in the plane coding target coordinate system $O_t$-$X_tY_t$, and arranging the second image in the image pair acquired for the $1^{st}$ at an original point in the spliced image coordinate system;

a splicing step: cooperating the first XY motion platform with the second XY motion platform to perform step scanning, triggering the first image acquisition device and the second image acquisition device to acquire images at the same time to obtain an image pair acquired for the $i^{th}$ time, wherein i>1 and i∈Z, then calculating coordinates $(x'_i, y'_i)$ of an image center of the first image in the image pair acquired for the $i^{th}$ time in the plane coding target coordinate system $O_t$-$X_tY_t$, converting the coordinates $(x'_i, y'_i)$ into coordinates $(x''_i, y''_i)$ of the second image in the image pair acquired for the $i^{th}$ time in the spliced image coordinate system, and splicing the second image in the image pair acquired for the $i^{th}$ time to the coordinates $(x''_i, y''_i)$ in the spliced image coordinate system according to the coordinates $(x''_i, y''_i)$; and a judgment step: judging whether a currently spliced region reaches a range to be spliced:

when the currently spliced region reaches the range to be spliced, completing the splicing; and otherwise, updating that i=i+1, and repeatedly executing the splicing step until the currently spliced region reaches the range to be spliced.

The technical solution provided by embodiments of the present application may comprise the following beneficial effects.

The plane coding target is composed of the array of the plurality of coding units with a lot of mutually different coding information. Each coding unit is composed of several coding point patterns and positioning point patterns. The coded sub-region and the positioned region are the equilateral triangles with equal areas, thus being distributed at 60° to each other, which is beneficial for decoding. Moreover, other normal coding points may be traversed as long as the central coding point or the normal coding point of any coded sub-region or positioned region is positioned. The positioning point is located in the positioned region, and may be well identified and screened out.

According to the two-dimensional image splicing system and method applying the plane coding target, the first image acquisition device and the second image acquisition device distributed left and right are utilized, the coding pattern of the plane coding target is acquired through the first image acquisition device, and then a specific location of the acquired first image in the plane coding target is calculated to realize an absolute location measurement function; the second image acquired by the second image acquisition device is guided to be spliced by using the location measurement function of the first image acquisition device, and the two-dimensional image splicing system may realize large-area splicing by using the wide-range plane coding target; in addition, the coding unit of the plane coding target has verification information, which effectively solves the problem of splicing error caused by a location identification error; moreover, the time of the system is mainly consumed on location calculation of the coding pattern the plane coding target, and this part also consumes a short time; and therefore, the image splicing system and method can realize large-range, high-precision and short-time two-dimensional image splicing.

Figure 1:
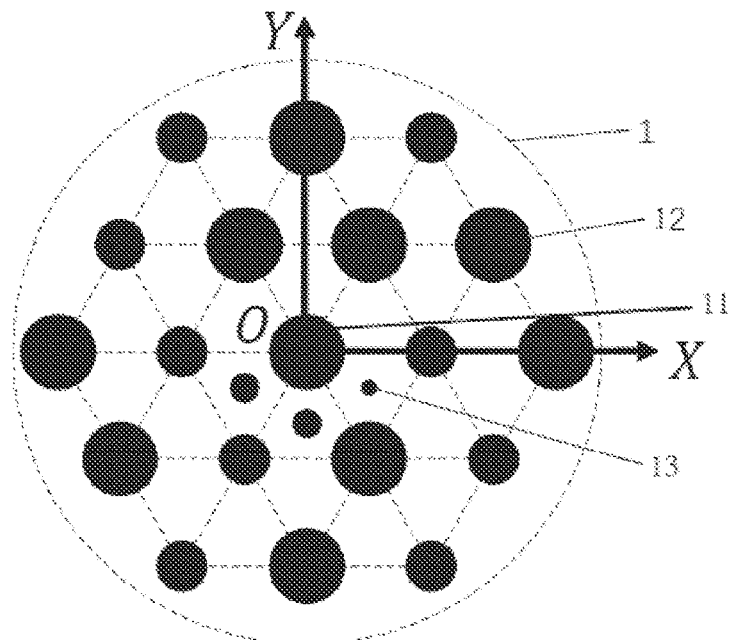
FIG. 1 is a schematic structural diagram of a coding unit in one of embodiments of the present invention.

In the drawings: 1 refers to coding unit; 11 refers to central coding point; 12 refers to normal coding point; 13 refers to positioning point; 2 refers to numerical value sequence container; 3 refers to data processing device; 4 refers to first image acquisition device; 5 refers to second image acquisition device; 6 refers to acquisition device connecting bracket; 7 refers to first XY motion platform; 8 refers to plane coding target; 9 refers to coding target fixing base; 10 refers to second XY motion platform; 11 refers to measured object fixing base; 12 refers to data transmission line; 13 refers to first illuminating device; 14 refers to measured object; 15 refers to bottom illuminating device; 41 refers to first image; and 51 refers to second image.

DETAILED DESCRIPTION

Embodiments of the present invention are described in detail hereinafter, examples of the embodiments are shown in the drawings, and the same or similar reference numerals throughout the drawings denote the same or similar elements or elements having the same or similar functions. The embodiments described hereinafter with reference to the drawings are exemplary, are only intended to explain the present invention, and cannot be understood as limiting the present invention.

In the description of the present invention, it should be understood that, the orientation or position relationship indicated by the terms "up", "down", "top", "bottom", "inside". "outside", and the like is based on the orientation or position relationship shown in the drawings, it is only for the convenience of description of the present invention and simplification of the description, and it is not to indicate or imply that the indicated device or element must have a specific orientation, and be constructed and operated in a specific orientation. Therefore, the terms should not be understood as limiting the present invention. In addition, the feature defined by "first" and "second" may explicitly or implicitly comprise one or more of the features for distinguishing the described features, without order or importance.

In the description of the present invention, unless otherwise specified, the term "multiple" refers to being two or more.

In the description of the present invention, it should be noted that the terms "installation", "connected", "connection" and "setting" should be understood in a broad sense unless otherwise clearly specified and defined. For example, they may be fixed connection, removable connection or integrated connection; may be mechanical connection or electrical connection; and may be direct connection, or indirect connection through an intermediate medium, and connection inside two elements. The specific meanings of the above terms in the present invention can be understood in a specific case by those of ordinary skills in the art.

Figure 8:
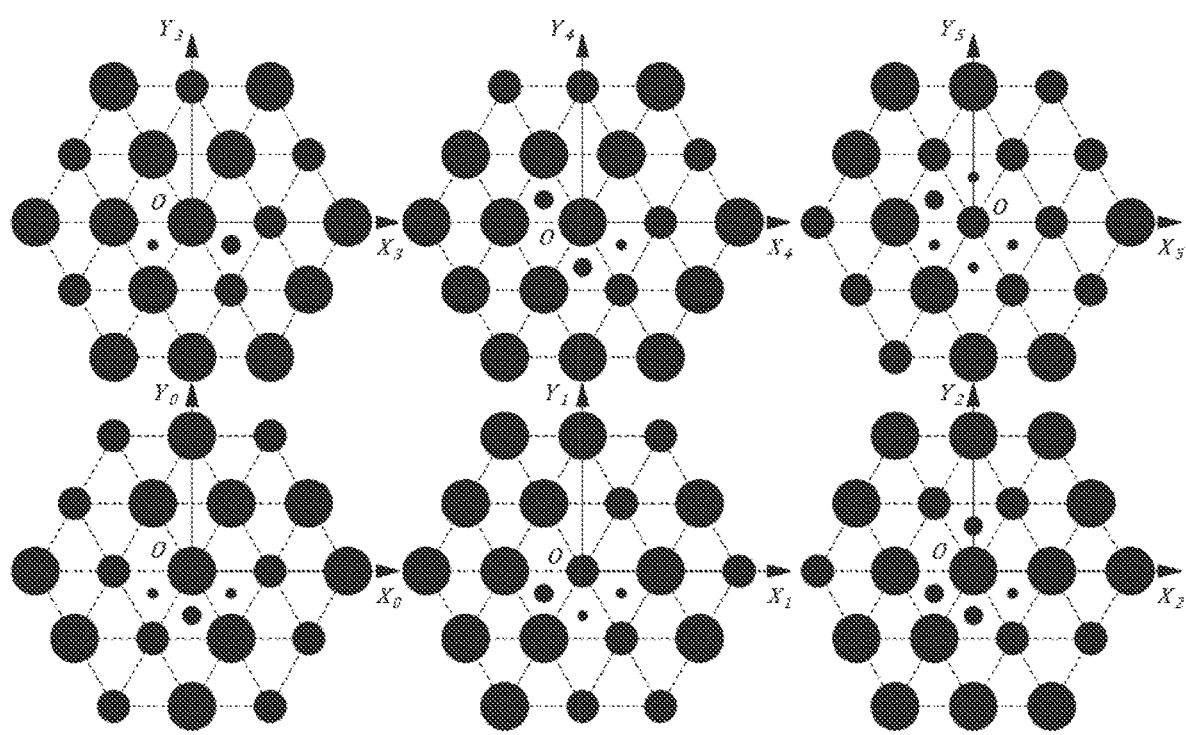
FIG. 8 is a schematic diagram of an expanded pattern of a plane coding target in one of embodiments of the present invention.
Figure 9:
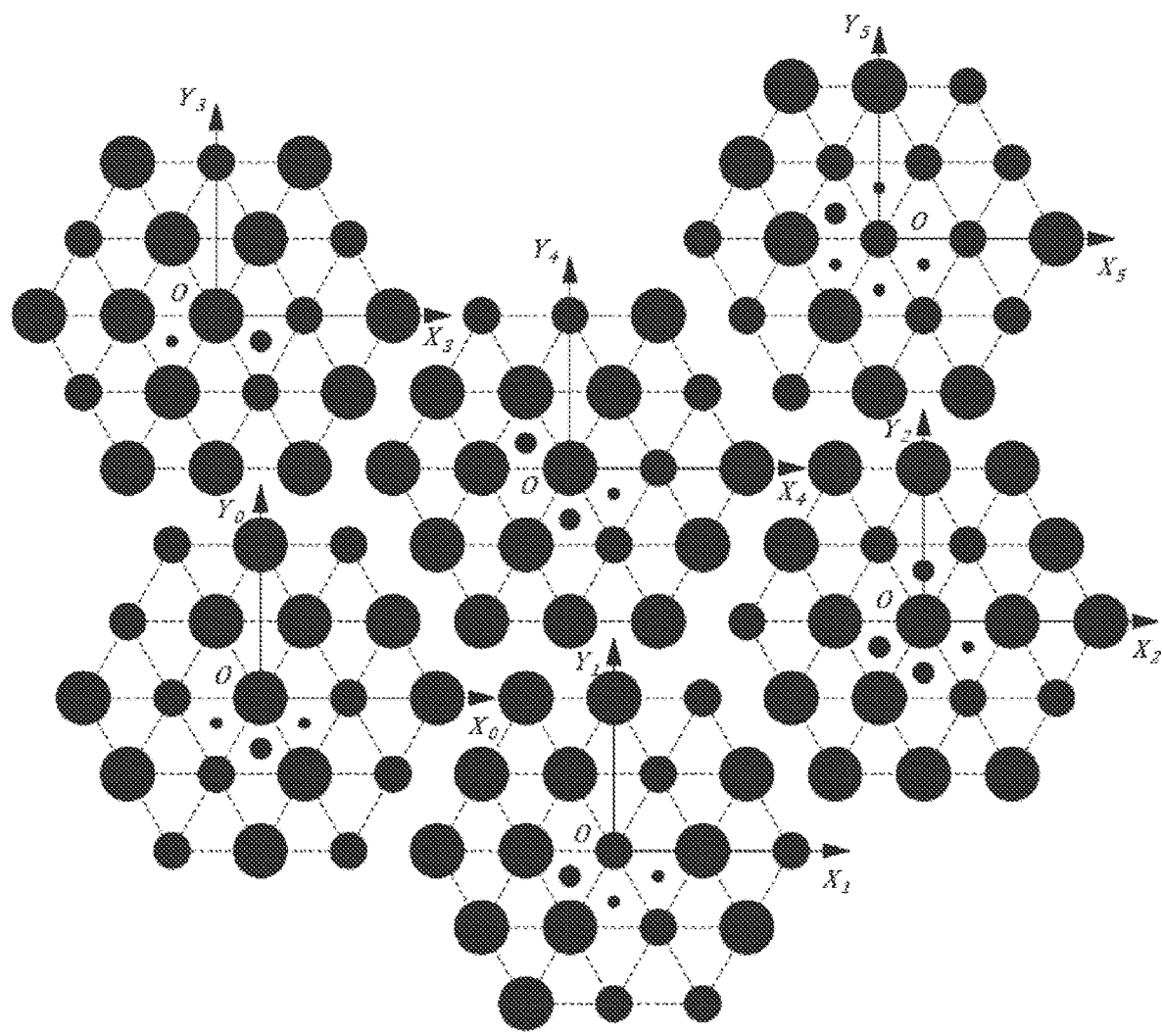
FIG. 9 is a schematic diagram of another expanded pattern of the plane coding target in one of embodiments of the present invention.

The technical solution provides a plane coding target 8, as shown in FIG. 1, FIG. 8 and FIG. 9, the plane coding target comprises a plurality of coding units 1 distributed in an array, the coding unit 1 comprises one central coding point 11, a plurality of normal coding points 12 and at least one positioning point 13, a circular coded region of the coding unit 1 is constructed by taking the central coding point 11 as a center of circle and R as a construction radius, and the normal coding points 12 are located in an interior or at an edge of the circular coded region.

The central coding point 11 and any two normal coding points 12 adjacent to the central coding point form a positioned region, any three adjacent normal coding points 12 form a coded sub-region, the coded sub-region and the positioned region are equilateral triangles with equal areas, the positioning point 13 is located in the positioned region, and only one positioning point 13 is allowed to exist in each positioned region. When the coding unit 1 has only one positioning point 13, the positioning point 13 is incapable of being located at a center-of-gravity location of the positioned region.

A coding unit coordinate system of the coding unit 1 takes the central coding point 11 as an original point, a direction towards one of the normal coding points 12 adjacent to the central coding point 11 is an X axis, and a direction perpendicular to the X axis is a Y axis.

The central coding point 11 and the normal coding point 12 are both provided with a coding point pattern, different coding point patterns are arranged on the central coding point 11 and the normal coding point 12 for coding, the coding point patterns have mutually different and unique coding numerical values, and the central coding point 11 and the normal coding point 12 both have mutually different and unique coding serial numbers.

A positioning point distribution style of the positioning point 13 is used for determining coordinates of the central coding point 11 and the normal coding point 12 in the coding unit coordinate system.

The coding unit 1 sequentially acquires the coding numerical values of the coding point patterns on the central coding point 11 and the normal coding point 12 according to the coding point serial numbers, and generates a coding numerical value sequence of the coding unit 1, and the coding units 1 have mutually different and unique coding numerical value sequences.

The plane coding target 8 is composed of the array of the plurality of coding units 1 with a lot of mutually different coding information. Each coding unit 1 is composed of several coding point patterns and positioning point patterns.

Each coding unit 1 has one central coding point 11. Other coding points, which are namely the normal coding points 12, are regularly distributed around the central coding point 11. Comprising the central coding point 11, any three mutually adjacent coding points are distributed as the equilateral triangle to respectively form the coded sub-region and the positioned region, and a side length of the equilateral triangle is L.

The normal coding point 12 on the coding unit 1 is constructed with the central coding point 11 as the center of circle and the R (R≥L) as the construction radius, and the central coding point 11 and the normal coding point 12 located in the interior or at the edge of the circular coded region both belong to one coding unit 1. The construction radius is set for the coding unit 1, so that a coding capacity of the coding unit may be selected, and flexible coding is realized.

The coded sub-region and the positioned region are the equilateral triangles with equal areas, thus being distributed at 60° to each other, which is beneficial for decoding. Moreover, other normal coding points 12 may be traversed as long as the central coding point 11 or the normal coding point 12 of any coded sub-region or positioned region is positioned. The positioning point 13 is located in the positioned region, and may be well identified and screened out.

Preferably, the coding unit 1 respectively marks the unique coding serial numbers for the central coding point 11 and each normal coding point 12 according to a preset sampling sequence, and the coding serial numbers are 0 to K−1 respectively, wherein K is a total number of the central coding point 11 and the normal coding points 12.

The coding numerical values of the coding point patterns are 0, 1, . . . , N−2 and N−1 respectively, wherein N is a number of types of the coding point patterns.

The coding unit 1 sequentially acquires the coding numerical values of the coding point patterns on the central coding point 11 and the normal coding point 12 according to the coding point serial numbers as $V_0, V_1, \ldots, V_{K-2}$ and $V_{K-1}$ respectively, and generates the coding numerical value sequence of the coding unit 1 as $[V_0, V_1, \ldots, V_{K-2}, V_{K-1}]$.

Preferably, M positioning point distribution styles are provided, serial numbers of the positioning point distribution styles are 0, 1, . . . , M−1 and M−1 respectively, and a number of positioning points 13 contained in an $m^{th}$ positioning point distribution style is $K'_m$, wherein $0 \leq m \leq M-1$, $m \in Z$ and $K'_m \in Z$.

The positioning points 13 are numbered clockwise from the X axis of the coding unit coordinate system to obtain positioning point numbers of the positioning points 13 as 0 to $K'_m-1$ respectively.

The positioning points 13 are provided with the same positioning point pattern or different positioning point patterns.

When the positioning point patterns of the positioning points 13 of the coding unit 1 are the same, the positioning point patterns are used for determining the central coding point 11 and the coding unit coordinate system.

When the positioning point patterns of the positioning points 13 of the coding unit 1 are different, the number of types of the positioning point patterns of the positioning points 13 is defined as N', a unique pattern number is assigned to each positioning point pattern, and a value range of the pattern number is 0, 1, . . . , N'−2 and N'−1.

A verification numerical value of each positioning point 13 is:

$$C_k = [(\Sigma_0^{K-1} V_i)/(N'^k)]\% N', \ 0 \leq k \leq K'_m-1;$$

wherein, $C_k$ is a verification numerical value of a positioning point with a positioning point number k, a verification numerical value sequence of the coding unit 1 is generated as $[C_0, \ldots, C_{K'_m-1}]$, $V_1$ is each item in the coding numerical value sequence $[V_0, V_1, \ldots, V_{K-2}, V_{K-1}]$ of the coding unit 1, % is mathematically complementary symbol, and [·] is a mathematically rounded symbol.

Moreover, when N'=1, the positioning point 13 is only used for positioning the central coding point 11 and the coding unit coordinate system, which means that numerical values in the coding numerical value sequence are added for mixing first, and the numerical values in the coding numerical value sequence are mixed to obtain one numerical value. Then, the numerical value is divided by different powers of the number of types, and a remainder is taken by gradient as the verification numerical value.

The verification numerical value sequence of the coding unit 1 is used in an identification stage for verifying the acquired coding numerical value sequence of the coding unit 1.

There are 6 positioned regions around the central coding point 11. Numbers and distribution locations of the positioning points 13 of different coding units 1 may be the same form or different forms. The distribution style of the positioning point 13 relative to the central coding point 11 may be preset. In a process of generating the coding point pattern, each coding unit 1 selects a preset positioning point distribution style to generate this part of pattern.

Different positioning point distribution styles may all distinguish the central coding point 11 from the normal coding point 12 of the coding unit 1 by using a distribution situation of the contained positioning point 13. The central coding point 11 of the coding unit 1 and the coding unit coordinate system may be uniquely determined according to the distribution situation of the positioning point 13. Each positioning point pattern may be a uniform pattern, and is only used for positioning the central coding point 11 and the coding unit coordinate system. A shape and a size of the positioning point pattern may also be coded as the verification numerical value of the coding information (which is namely the coding numerical value sequence). A reliability of the plane coding target 8 is improved by verifying the coding information, thus avoiding an influence of the identification error on a measurement result, and improving a safety.

However, when the coding unit 1 has only one positioning point 13, the positioning point 13 is incapable of being located at the center-of-gravity location of the positioned region, because the central coding point 11 cannot be distinguished from other normal coding points 12 connected with the central coding point.

Each coding unit 1 may generate the positioning point pattern of the positioning point 13 by using one of the positioning point distribution styles. Each positioning point distribution style can uniquely determine the central coding point 13 and the coding unit coordinate system of the coding unit 1 through the distribution situation of the positioning point 13. Different positioning point distribution styles are well differentiated. Details are described as follows.

Figure 2A:
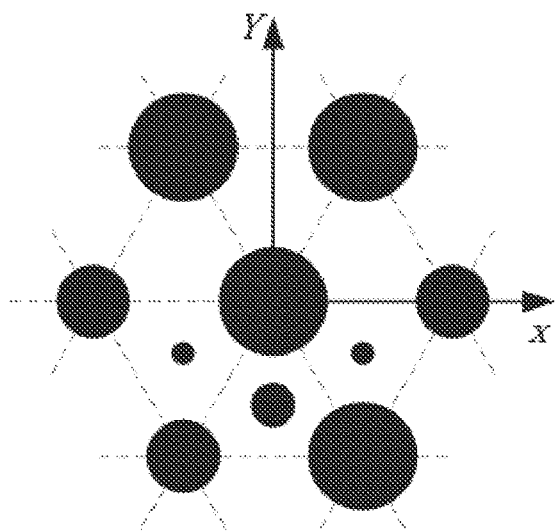
FIG. 2A and FIG. 2B are schematic diagrams of two positioning point distribution styles incapable of coexisting in one of embodiments of the present invention.
Figure 2B:
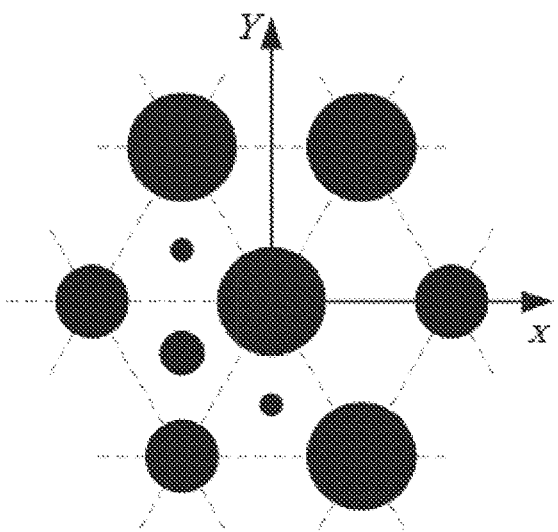

1. Two positioning point distribution styles capable of overlapping after rotating around the central coding point 11 cannot coexist. Although the central coding point 11 can be positioned, the coding unit coordinate system cannot be uniquely determined. As shown in FIG. 2A and FIG. 2B, after the plane coding target 8 is rotated, the coding unit coordinate system cannot be uniquely determined, which means the corresponding positioning point distribution style is unknown in an identification stage. Therefore, the two positioning point distribution styles shown in FIG. 2A and FIG. 2B cannot coexist in a positioning point distribution style category, and only one positioning point distribution style may be selected. (The positioning points 13 are all located at the center-of-gravity location of the positioned region).

Figure 3:
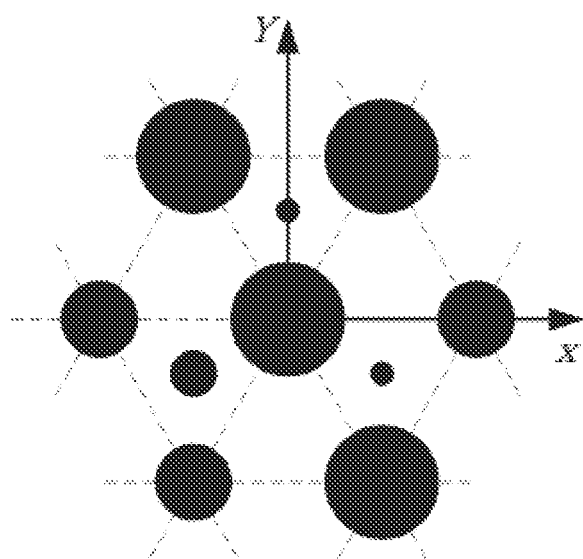
FIG. 3 is a schematic structural diagram of an unqualified coding unit incapable of being used as a positioning point distribution style in one of embodiments of the present invention.
Figure 4:
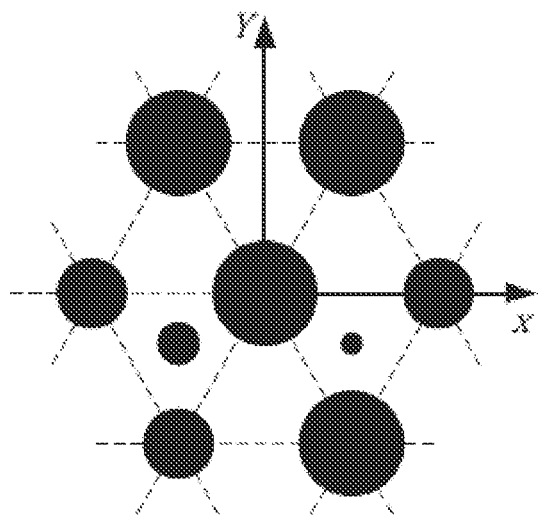
FIG. 4 is a schematic diagram of a positioning point distribution style containing two positioning point patterns in one of embodiments of the present invention.
Figure 5A:
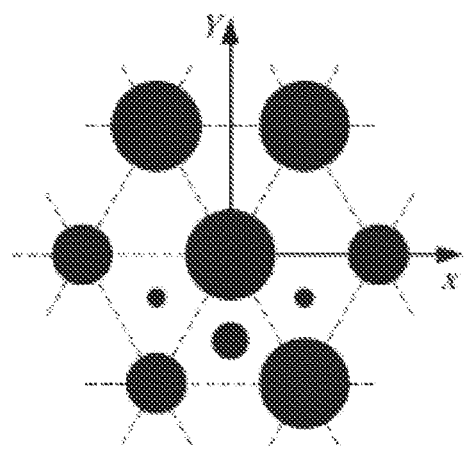
FIG. 5A, FIG. 5B and FIG. 5C are schematic diagrams of a positioning point distribution style containing three positioning point patterns in one of embodiments of the present invention.
Figure 5B:
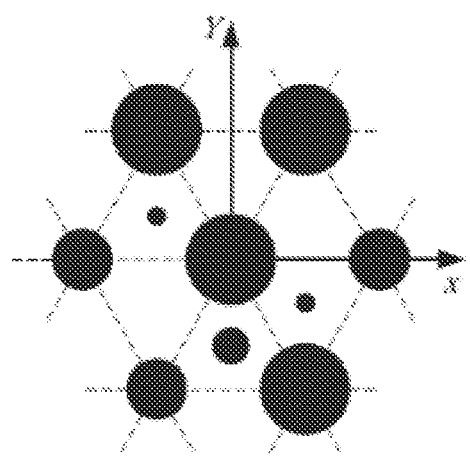
Figure 5C:
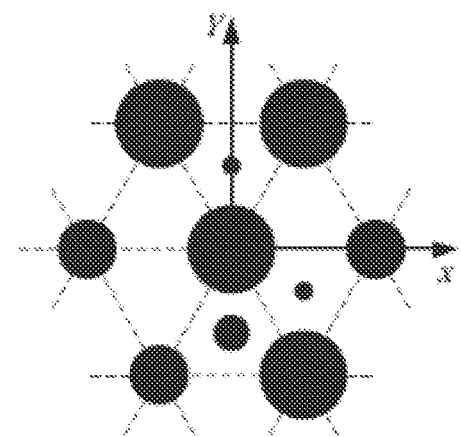
Figure 6A:
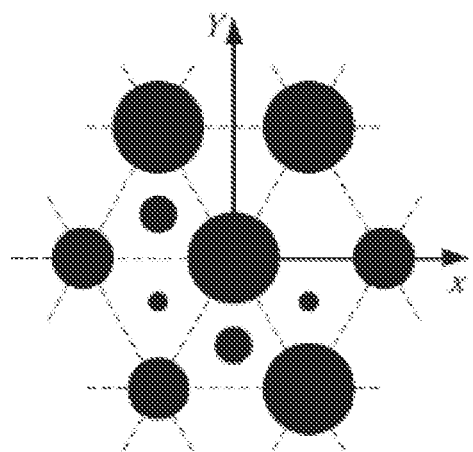
FIG. 6A and FIG. 6B are schematic diagrams of a positioning point distribution style containing four positioning point patterns in one of embodiments of the present invention.
Figure 6B:
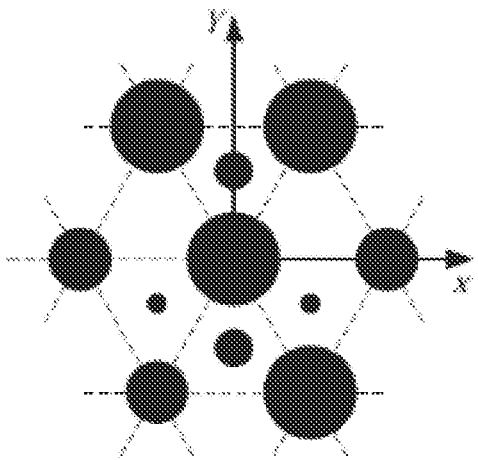
Figure 7:
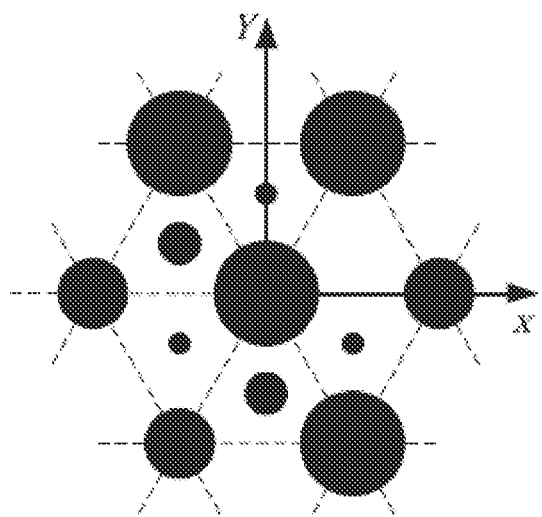
FIG. 7 is a schematic diagram of a positioning point distribution style containing five positioning point patterns in one of embodiments of the present invention.

2. The positioning point distribution style capable of overlapping itself after rotating around the central coding point 11 cannot meet the requirement of uniquely determining the coding unit coordinate system and cannot be used as the positioning point distribution style. As shown in FIG. 3, the positioning point distribution style rotates and overlaps itself. After the plane coding target 8 is rotated, the coding unit coordinate system cannot be uniquely determined, which means that the coding unit coordinate system cannot be uniquely determined in the identification stage, so that a serial number of the normal coding point 12 and the acquired coding numerical value sequence and verification numerical value sequence cannot be determined. Therefore, the positioning point distribution style does not meet the requirement and cannot be used as the positioning point distribution style. (The positioning points 13 are all located at the center-of-gravity location of the positioned region).

FIG. 4 to FIG. 7 show examples of the positioning point distribution style, and it can be known that in the positioning point distribution style, each positioning point 13 is located at the center-of-gravity location of the positioned region (in a shape of equilateral triangle). Certainly, the positioning point 13 may not be located at the center-of-gravity location of the positioned region (in a shape of equilateral triangle), as long as the conditions that the distribution situation of the positioning point 13 in the positioning point distribution style can uniquely determine the central coding point 11 and the coding unit coordinate system of the coding unit 1, and different positioning point distribution styles can also be well distinguished after the plane coding target 8 is rotated are met, and no examples will be given herein.

Preferably, as shown in FIG. 8, a coding pattern of the plane coding target 8 takes a generated coding unit coordinate system of a first coding unit 1 as a reference coordinate system, and the coded region is expanded by continuously expanding a plurality of coding units 1 to an adjacent uncoded region.

In the coding pattern of the plane coding target 8, the X axis of the coding unit coordinate system of each coding unit 1 has the same orientation and is parallel to each other, and the Y axis of the coding unit coordinate system of each coding unit 1 has the same orientation and is parallel to each other.

Figure 10:
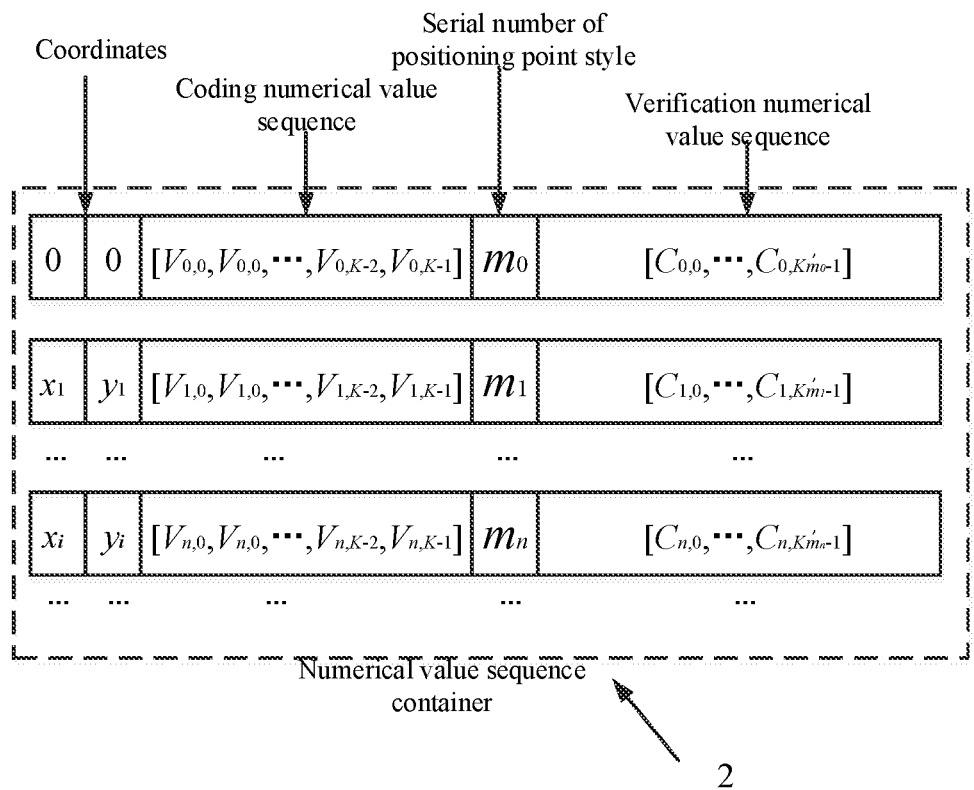
FIG. 10 is a schematic structural diagram of a numerical value sequence container in one of embodiments of the present invention.

As shown in FIG. 10, a numerical value sequence container 2 is further comprised, the numerical value sequence container 2 records coordinates of an expanded coding unit 1 in the reference coordinate system and a coding numerical value sequence of the expanded coding unit, the numerical value sequence container 2 contains a plurality of records, and each record stores coordinates in the reference coordinate system, a coding numerical value sequence, a serial number of a positioning point distribution style and a verification numerical value sequence of one coding unit 1.

The plane coding target 8 is composed of the array of the plurality of coding units 11 with a lot of mutually different coding numerical value sequences. The coding pattern takes the generated coding unit coordinate system of the first coding unit 1 as the reference coordinate system. The coded region is expanded by continuously expanding the plurality of coding units 1 to the adjacent uncoded region. The coordinates in the reference coordinate system and the coding numerical value sequence of the expanded coding unit 1 are recorded at the same time, and the coordinates in the reference coordinate system, the coding numerical value sequence, the serial number of the positioning point distribution style and the verification numerical value sequence are stored in the numerical value sequence container 2 as one record. Each record corresponds to information of one coding unit 1, which is convenient for subsequent positioning and searching.

The expanding mode may make the central coding point 11 of each coding unit 1 in the plane coding target 8 show array distribution with equal spacing, as shown in FIG. 8, and may also make all coding point patterns in the coding pattern show array distribution staggered in a column direction, as shown in FIG. 9, so that the plane coding target 8 has a compact pattern, without a larger uncoded region.

Preferably, the coding point pattern and the positioning point pattern are both geometric shapes, various coding point patterns are different in at least one difference attribute, various positioning point patterns are different in at least one difference attribute, and the difference attribute comprises a shape, a size, a color and a transparency.

A side length of the coded sub-region and a side length of the positioned region are both L, and the side length L is no greater than the construction radius R.

The positioning point distribution styles of different coding units 1 are the same or different, the positioning points 13 of different positioning point distribution styles have different distribution locations relative to the central coding point 11, and numbers of the positioning points 13 of different positioning point distribution styles are the same or different.

The shape of the coding point pattern may be an easily identified geometric shape, such as a circle, an ellipse, a ring, a triangle and a quadrangle. Among the coding point patterns, as long as a coding point pattern is different in one of shape, size, color, transparency and other difference attributes capable of distinguishing differences, the coding point pattern may be regarded as a different coding point pattern. For example, circles of different sizes, circles of the same size and different gray scales, circles of the same size and different colors, and circles of the same size and different transparencies are all different coding point patterns.

Figure 11:
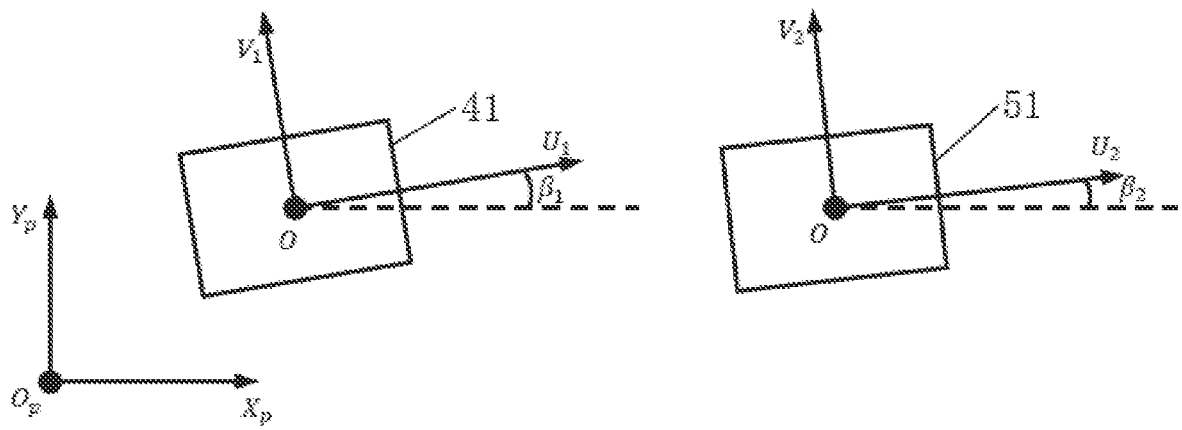
FIG. 11 is a schematic calibration diagram of an included angle (31 and an included angle β2 in one of embodiments of the present invention.

Preferably, a two-dimensional image splicing system for the plane coding target 8, as shown in FIG. 11, comprises a data processing device 3, a first image acquisition device 4, a second image acquisition device 5, an acquisition device connecting bracket 6, a first XY motion platform 7, the plane coding target 8, a coding target fixing base 9, a second XY motion platform 10 and a measured object fixing base 11.

The first image acquisition device 4 is connected with the second image acquisition device 5 through the acquisition device connecting bracket 6, the acquisition device connecting bracket 6 is connected with the first XY motion platform 7, the first XY motion platform 7 drives the acquisition device connecting bracket 6 to move, and the first image acquisition device 4 and the second image acquisition device 5 are respectively in communication connection with the data processing device 3 through a data transmission line 12.

The plane coding target 8 covers an upper surface of the whole coding target fixing base 9, an upper surface of the measured object fixing base 11 is used for placing and fixing a measured object 14, the coding target fixing base 9 and the measured object fixing base 11 are both fixed on the second XY motion platform 10, the second XY motion platform 10 drives the coding target fixing base 9 and the measured object fixing base 11 to move synchronously, and the second XY motion platform 10 is located below the first XY motion platform 7.

An optical axis direction of the first image acquisition device 4 is parallel to an optical axis direction of the second image acquisition device 5, the optical axis direction of the first image acquisition device 4 vertically points to the upper surface of the coding target fixing base 9, and the optical axis direction of the second image acquisition device 5 vertically points to the upper surface of the measured object fixing base 11.

A motion plane of the first XY motion platform 7 is perpendicular to the optical axis direction of the first image acquisition device 4; and a motion plane of the second XY motion platform 10, the motion plane of the first XY motion platform 7, the upper surface of the coding target fixing base 9 and the upper surface of the measured object fixing base 11 are parallel to each other.

According to the two-dimensional image splicing system applying the plane coding target 8, the first image acquisition device 4 and the second image acquisition device 5 distributed left and right are utilized, the coding pattern of the plane coding target 8 is acquired through the first image acquisition device 4, and then a specific location of an acquired first image 41 in the plane coding target 8 is calculated to realize an absolute location measurement function. A second image 51 acquired by the second image acquisition device 5 is guided to be spliced by using the location measurement function of the first image acquisition device 4, and the two-dimensional image splicing system may realize large-area splicing by using the wide-range plane coding target 8. In addition, the coding unit 1 of the plane coding target 8 has verification information, which effectively solves the problem of splicing error caused by a location identification error. Moreover, the time of the system is mainly consumed on location calculation of the coding pattern the plane coding target 8, and this part also consumes a short time. Therefore, the image splicing system and method can realize large-range, high-precision and short-time two-dimensional image splicing.

The data processing device 3 is generally a microcomputer, a computer, etc. with a data processing function, and is connected with the first image acquisition device 4 and the second image acquisition device 5 respectively through the data transmission line 12. The data processing device 3 sends an acquisition instruction to control the first image acquisition device 4 and the second image acquisition device 5, and receives the images acquired by the two image acquisition devices. The first image acquisition device 4 and the second image acquisition device 5 are generally composed of a camera matched with an optical lens.

The second XY motion platform 10 is provided with a leveling device, the leveling device is used for leveling the coding target fixing base 9 and the measured object fixing base 11, so that the upper surface of the coding target fixing base 9 and the upper surface of the measured object fixing base 11 are parallel to the second XY motion platform 10.

The plane coding target 8 may be produced on the coding target fixing base 9 made of a hard material uneasy to deform by laser marking, etching, printing or pasting of the coding pattern. For example, the coding pattern is marked by laser on the coding target fixing base 9 made of ceramic or glass.

Natural light illumination, top illumination and bottom illumination may be used in the two-dimensional image splicing system; and according to different measurement environments and measured objects, different illuminating methods may be used. Natural light does not need an additional light source for illumination, and is suitable in good light environment such as having uniform illumination. A first illuminating device 13 needs to be arranged for the top illumination, and the first illuminating device 13 illuminates the plane coding target 8 or the measured object 14 along the optical axis directions of the first image acquisition device 4 and the second image acquisition device 5 respectively, and an illuminating light source used in the first illuminating device 13 may be a ring light source, a surface light source, a coaxial light source, etc. A bottom illuminating device 15 needs to be arranged for the bottom illumination, the bottom illuminating devices 15 are mounted at bottom portions of the coding target fixing base 9 and the measured object fixing base 11 respectively, the bottom illuminating device 15 may be a fluorescent plate, a backlight plate, etc., the bottom illumination requires that the coding target fixing base 9 and the measured object fixing base 11 have certain light transmittance, and enough spaces are left at the bottom portions of the coding target fixing base and the measured object fixing base to mount the bottom illuminating devices 15.

Figure 13:
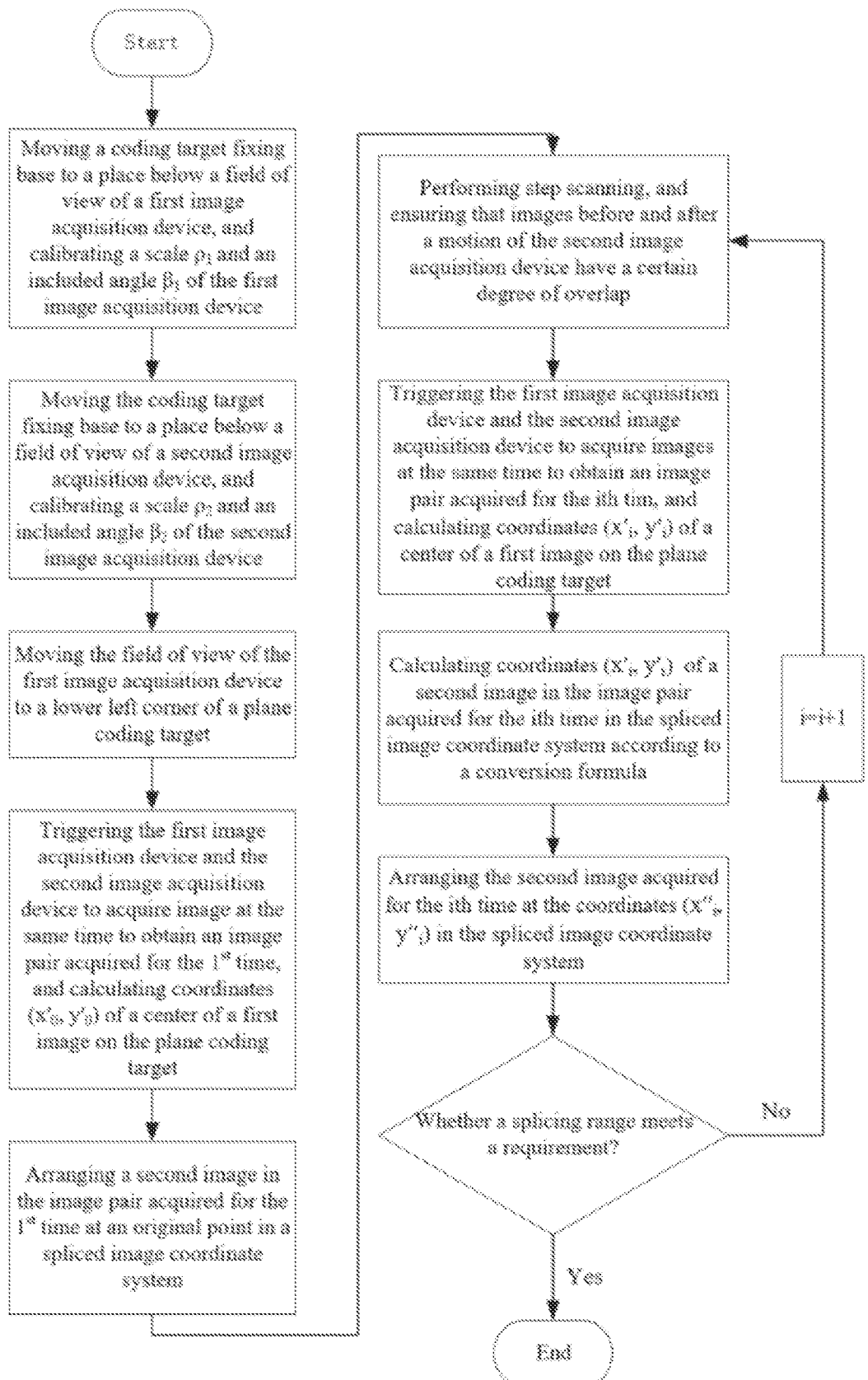
FIG. 13 is a splicing flow chart of the image splicing system applying the plane coding target in one of embodiments of the present invention.

Preferably, a splicing method of the two-dimensional image splicing system for the plane coding target 8, as shown in FIG. 13, comprises the following steps. In a target generation step, the corresponding plane coding target 8 is generated according to a measurement occasion requirement, and the plane coding target 8 is arranged on the upper surface of the coding target fixing base 9 by the data processing device 3.

In a coordinate system establishment step, a second XY motion platform coordinate system $O_p$-$X_p Y_p$ of the second XY motion platform 10, a first XY motion platform coordinate system $O'_p$-$X'_p Y'_p$ of the first XY motion platform 7, a plane coding target coordinate system $O_t$-$X_t Y_t$ of the plane coding target 8, a first image coordinate system $O$-$U_1 V_1$ of a first image 41 acquired by the first image acquisition device 4 and a second image coordinate system $O$-$U_2 V_2$ of a second image 51 acquired by the second image acquisition device are respectively established, and a spliced image coordinate system needed for image splicing is stored by the data processing device 3.

In a splicing original point setting step, a field of view of the first image acquisition device 4 is moved to a lower left corner region of the plane coding target 8 through motions of the first XY motion platform 7 and the second XY motion platform 10, then the first image acquisition device 4 and the second image acquisition device 5 are triggered to acquire images at the same time, wherein a first sheet of first image 41 and a first sheet of second image 51 acquired form an image pair acquired for the $1^{st}$ time, and the first image 41 needs to contain a pattern of at least one coding unit 1, then coordinates $(x'_0, y'_0)$ of an image center of the first image 41 in the image pair acquired for the $1^{st}$ time in the plane coding target coordinate system $O_t$-$X_tY_t$ are calculated, and the second image 51 in the image pair acquired for the $1^{st}$ time is arranged at an original point in the spliced image coordinate system.

After the acquisition for the first time, the original point of the spliced image needs to be determined. In the image pair acquired for the $1^{st}$ time (that is, i=0), the acquisition for the first time by the first image acquisition device 4 determines an initial location in the plane coding target coordinate system $O_t$-$X_tY_t$, and then the coordinates $(x'_0, y'_0)$ are subtracted to obtain a motion amount. The second image acquisition device 5 performs splicing by using information of the first image acquisition device 4, the acquisition for the first time by the second image acquisition device 5 also needs to determine the original point, a center of the second image 51 in the image pair acquired for the 1st time is taken as the original point of splicing, and calculated coordinates $(x''_i, y''_i)$ of subsequently acquired image pair are coordinates relative to the original point in the spliced image coordinate system.

In a splicing step, the first XY motion platform 7 is cooperated with the second XY motion platform 10 to perform step scanning, the first image acquisition device 4 and the second image acquisition device 5 are triggered to acquire images at the same time to obtain an image pair acquired for the $i^{th}$ time, wherein i>1 and i∈Z, then coordinates $(x'_i, y'_i)$ of an image center of the first image 41 in the image pair acquired for the $i^{th}$ time in the plane coding target coordinate system $O_t$-$X_tY_t$ are calculated, the coordinates $(x'_i, y'_i)$ are converted into coordinates $(x''_i, y''_i)$ of the second image 51 in the image pair acquired for the $i^{th}$ time in the spliced image coordinate system, and the second image 51 in the image pair acquired for the $i^{th}$ time is spliced to the coordinates $(x''_i, y''_i)$ in the spliced image coordinate system according to the coordinates $(x''_i, y''_i)$.

In a judgment step, whether a currently spliced region reaches a range to be spliced is judged: when the currently spliced region reaches the range to be spliced, the splicing is completed; and otherwise, i=i+1 is updated, and the splicing step is repeatedly executed until the currently spliced region reaches the range to be spliced.

In the splicing method of the two-dimensional image splicing system applying the plane coding target 8, the first image acquisition device 4 and the second image acquisition device 5 are fixedly connected, so that there is no relative movement between the first image acquisition device and the second image acquisition device; and the coding target fixing base 9 and the measured object fixing base 11 are fixedly connected onto the second XY motion platform 10, so that there is no relative movement. Therefore, an amount of motion of the plane coding target 8 observed by the first image acquisition device 4 is equal to an amount of motion of the measured object 14 observed by the first image acquisition device 4. Since the plane coding target 8 is used as an observation object of the first image acquisition device 4, as long as an acquisition region of the first image acquisition device 4 can cover the pattern of one coding unit 1, the location of the acquired first image 41 in the plane coding target coordinate system $O_t$-$X_tY_t$ may be obtained in real time. By triggering the first image acquisition device 4 and the second image acquisition device 5 to acquire images at the same time, the second image acquisition device 5 may be guided to perform image splicing by using observation information of the first image acquisition device 4, so that large-area splicing may be realized by using the wide-range plane coding targets 8. Moreover, the coding unit 1 of the plane coding target 8 has verification information, which effectively solves the problem of splicing error caused by a location identification error, thus realizing wide-range, high-precision and short-time two-dimensional image splicing. In the splicing original point setting step, the first XY motion platform 7 is cooperated with the second XY motion platform 10 for driving, which is not limited to the driving by the first XY motion platform 7 or the second XY motion platform 10, but may also refer to the driving by the first XY motion platform 7 and the second XY motion platform 10 at the same time, as long as the field of view of the first image acquisition device 4 can be moved to the lower left corner of the plane coding target 8. Similarly, in the splicing step, the first XY motion platform 7 is cooperated with the second XY motion platform 10 for driving, which is not limited to the driving by the first XY motion platform 7 or the second XY motion platform 10, but may also refer to the driving by the first XY motion platform 7 and the second XY motion platform 10 at the same time, as long as the step scanning can be realized.

Preferably, between the coordinate system establishment step and the splicing original point setting step, the splicing method further comprises a mounting deviation correction step.

In step A1, the coding target fixing base 9 is driven to move to a place below the field of view of the first image acquisition device 4 through the motions the first XY motion platform and the second XY motion platform, and the first image 41 of the plane coding target 8 is acquired as a first corrected image by the first image acquisition device 4. The first XY motion platform 7 is cooperated with the second XY motion platform 10 for driving, which is not limited to the driving by the first XY motion platform 7 or the second XY motion platform 10, but may also refer to the driving by the first XY motion platform 7 and the second XY motion platform 10 at the same time, as long as the coding target fixing base 9 can be driven to move to the place below the field of view of the first image acquisition device 4.

In step A2, the coding target fixing base 9 is driven to move to a place below a field of view of the second image acquisition device 5 through the second XY motion platform 10, and the second image 51 of the plane coding target 8 is acquired as a second corrected image by the second image acquisition device 5.

In step A3, a record of a certain coding unit 1 in the first corrected image in the numerical value sequence container 2 is extracted and a first corrected image coordinate system of the first corrected image is established; and a record of a certain coding unit 1 in the second corrected image in the numerical value sequence container 2 is extracted and a second corrected image coordinate system of the second corrected image is established by the data processing device 3.

In step A4, an included angle $\beta_1$ between the first corrected image coordinate system and the plane coding target coordinate system $O_t$-$X_tY_t$ and an included angle $\beta_2$ between the second corrected image coordinate system and the plane coding target coordinate system $O_t$-$X_tY_t$ are calculated by the data processing device 3.

In step A5, the first image acquisition device 4 is calibrated by acquiring pixel coordinates and actual physical coordinates of a central coding point 11 or a normal coding point 12 of a certain coding unit 1 on the first corrected image to obtain a scale $\rho_1$ of the first image acquisition device 4; and the second image acquisition device 5 is calibrated by acquiring pixel coordinates and actual physical coordinates of a central coding point 11 or a normal coding point 12 of a certain coding unit 1 on the second corrected image to obtain a scale $\rho_2$ of the second image acquisition device 5.

Figure 12:
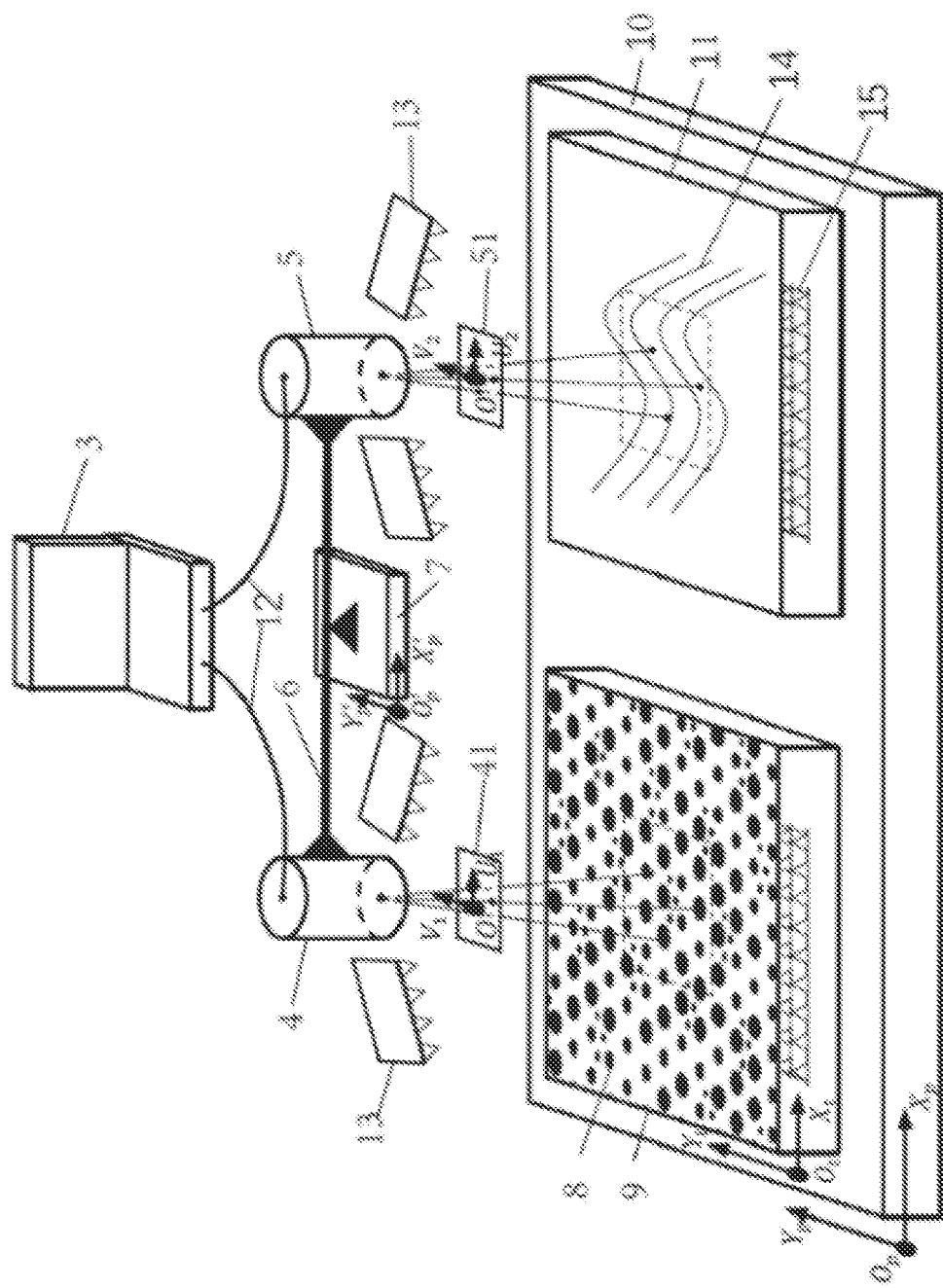
FIG. 12 is a schematic structural diagram of an image splicing system applying the plane coding target in one of embodiments of the present invention.

Considering a mounting deviation of the two-dimensional image splicing system in a mounting process, the first image coordinate system O-$U_1V_1$ and the second image coordinate system O-$U_2V_2$ both have certain included angles with the plane coding target coordinate system $O_t$-$X_tY_t$, as shown in FIG. 12, which are $\beta_1$ and $\beta_2$ respectively. By acquiring the first corrected image and the second corrected image, and extracting the coding unit coordinate system determined by the distribution situation of the positioning point 13 and the central coding point 11 of the coding unit 1 in the first corrected image or the second corrected image, the included angle $\beta_1$ between the first corrected image coordinate system and the plane coding target coordinate system $O_t$-$X_tY_t$ and the included angle $\beta 2$ between the second corrected image coordinate system and the plane coding target coordinate system $O_t$-$X_tY_t$ may be obtained.

Before splicing, the included angles $\beta_1$ and $\beta_2$ are calibrated, and the scales of the first image acquisition device 4 and the second image acquisition device 5 are acquired as $\rho_1$ and $\rho_2$ respectively, which can improve a splicing precision, thus avoiding the splicing error caused by the location identification error.

Preferably, the splicing step and the judgment step are specifically as follows.

In step B1, the step scanning is performed by the first XY motion platform 7, and it is necessary to ensure that the second images 51 acquired before and after the motion of the second image acquisition device 5 have a certain degree of overlap with each other. The step scanning is to realize large-range splicing, and the degree of overlap refers to a proportion of overlap, wherein the degree of overlap should be less than 10% considering efficiency. The degree of overlap is to have an overlapped region, and image fusion may be implemented at a seam to improve a splicing effect.

In step B2, the first image acquisition device 4 and the second image acquisition device 5 are triggered to acquire images at the same time to obtain the image pair acquired for the $i^{th}$ time, wherein i>1 and i∈Z.

In step B3, coordinates ($u_i$, $v_i$) of a central coding point 11 of a certain coding unit 1 in the first image 41 in the image pair acquired for the $i^{th}$ time in the first image coordinate system O-$U_1V_1$ are extracted, and a record of the coding unit 1 in the numerical value sequence container 2 is extracted by the data processing device 3 to obtain coordinates ($x_i$, $y_i$) of the coding unit 1 in the plane coding target coordinate system $O_t$-$X_tY_t$. Since the first image acquisition device 4 can acquire a pattern of one complete coding unit 1 from the plane coding target 8 every time, the coordinates ($x_i$, $y_i$) of the coding unit 1 in the plane coding target coordinate system $O_t$-$X_tY_t$ may be obtained by querying in the numerical value sequence container 2 generated in a coding process.

Coordinates ($x'_i$, $y'_i$) of an image center of the first image 41 in the image pair acquired for the $i^{th}$ time in the plane coding target coordinate system $O_t$-$X_tY_t$ are calculated as follows:

$$\left\{ \begin{bmatrix} x'_i \\ y'_i \end{bmatrix} = \rho_1 \begin{bmatrix} u_i \\ v_i \end{bmatrix} + \begin{bmatrix} x_i \\ y_i \end{bmatrix} \right..$$

In step B4, coordinates ($x''_i$, $y''_i$) of the second image 51 in the image pair acquired for the $i^{th}$ time in the spliced image coordinate system are calculated as follows:

$$\begin{bmatrix} x''_i \\ y''_i \end{bmatrix} = \frac{1}{\rho_2} \begin{bmatrix} \cos(\beta_2) & -\sin(\beta_2) \\ \sin(\beta_2) & \cos(\beta_2) \end{bmatrix} \begin{bmatrix} x'_i - x'_0 \\ y'_i - y'_0 \end{bmatrix}.$$

In step B5, the second image 51 in the image pair acquired for the $i^{th}$ time is spliced to the coordinates ($x''_i$, $y''_i$) of the spliced image coordinate system according to the coordinates ($x''_i$, $y''_i$). Since only location information of the first image 41 acquired by the first image acquisition device 4 needs to be calculated in the splicing process, splicing parameters of an image of the measured object, which is namely the second image 51, may be obtained through the conversion in the step B4, with a strong real-time performance.

In step B6, whether the currently spliced region reaches the range to be spliced is judged:

when the currently spliced region reaches the range to be spliced, the splicing is completed; and otherwise, i=i+1 is updated, and the steps B2 to B5 are repeatedly executed until the currently spliced region reaches the range to be spliced.

It should be noted that in a process of calculating the coordinates ($x'_i$, $y'_i$) of the first image 41 in the plane coding target coordinate system $O_t$-$X_tY_t$, after obtaining the coding numerical value sequence, verification is performed according to the verification numerical value sequence to judge identification correctness.

The range to be spliced is a designated spliced region, specifically, whether a number of rows and a number of columns in XY scanning meet requirements is judged, and the number of rows and the number of columns are set to be able to cover the range to be spliced.

Figure 14:
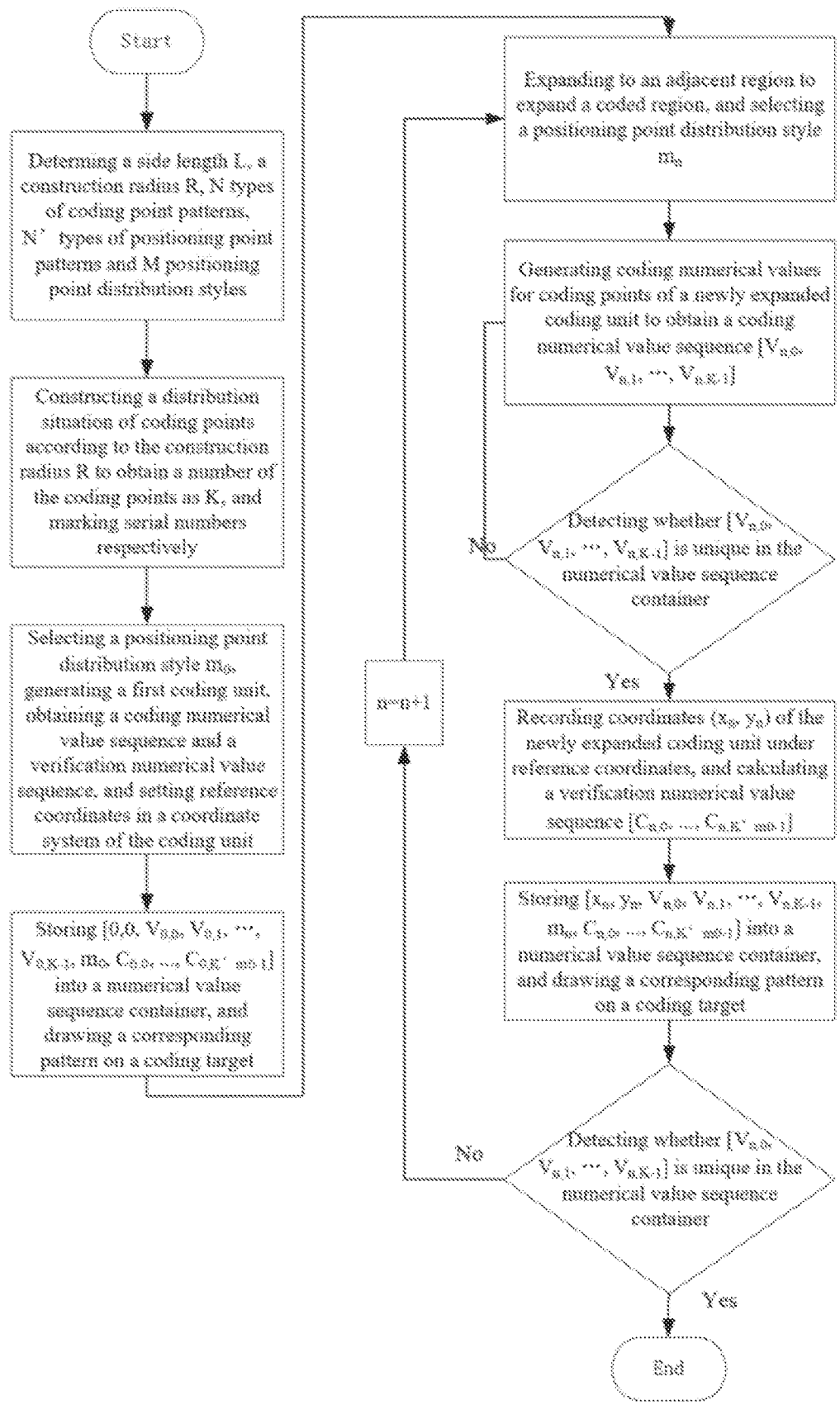
FIG. 14 is a generating flow chart of the plane coding target in one of embodiments of the present invention.

Preferably, as shown in FIG. 14, the target generation step specifically comprises:

step C1: determining the side length L of the coding sub-region and the positioned region, the construction radius R, the types of the coding point patterns, the types of the positioning point patterns and the positioning point distribution styles;

step C2: constructing distribution of the central coding point 11 and each normal coding point 12 in the coding unit 1 according to the construction radius R, and marking the central coding point 11 and each normal coding point 12 with the unique coding serial numbers respectively according to a preset sampling sequence;

step C3: selecting the positioning point distribution style as a serial number $m_0$, generating the first coding unit 1, acquiring the coding numerical value sequence [$V_{0,0}$, $V_{0,1}, \ldots, V_{0,K-2}, V_{0,K-1}$] and the verification numerical value sequence [$C_{0,0}, \ldots, C_{0,K'm0-1}$] of the first coding unit 1, and setting reference coordinates of the plane coding target coordinate system $O_t$-$X_tY_t$ in the coding unit coordinate system of the first coding unit 1;

step C4: recording and storing coordinates ($x_0$, $y_0$) of the first coding unit 1 in the plane coding target coordinate system $O_t$-$X_tY_t$, the coding numerical value sequence [$V_{0,0}$, $V_{0,1}, \ldots, V_{0,K-2}, V_{0,K-1}$], the serial number $m_0$ of the positioning point distribution style and the verification numerical value sequence [$C_{0,0}, C_{0,K'm0-1}$] by the numerical value sequence container 2, and then drawing a pattern of the first coding unit 1 according to the type of the coding point pattern and the type of the positioning point pattern selected;

step C5: expanding other coding units 1 to an adjacent uncoded region to expand the coded region, and selecting the positioning point distribution style as a serial number $m_n$, wherein $0 \leq m_n \leq M-1$;

step C6: respectively generating corresponding coding numerical values for a central coding point 11 and each normal coding point 12 of a newly expanded coding unit 1 to form a coding numerical value sequence [$V_{n,0}$, $V_{n,1}, \ldots, V_{n,K-2}, V_{n,K-1}$] of the newly expanded coding unit 1;

step C7: detecting whether the coding numerical value sequence [$V_{n,0}, V_{n,1}, \ldots, V_{n,K-2}, V_{n,K-1}$] is unique in the numerical value sequence container 2:

when the coding numerical value sequence [$V_{n,0}$, $V_{n,1}, \ldots, V_{n,K-2}, V_{n,K-1}$] is unique in the numerical value sequence container, executing the step C8, and otherwise, executing the step C6;

step C8: calculating a verification numerical value sequence [$C_{n,0}, \ldots, C_{n,K'm0-1}$] of the newly expanded coding unit 1, then recording and storing coordinates ($x_n$, $y_n$) of the newly expanded coding unit 1 in the plane coding target coordinate system $O_t$-$X_tY_t$, the coding numerical value sequence [$V_{n,0}, V_{n,1}, \ldots, V_{n,K-2}, V_{n,K-1}$], the serial number $m_n$ of the positioning point distribution style and the verification numerical value sequence [$C_{n,0}, \ldots, C_{n,K'm0-1}$] by the numerical value sequence container 2, and then drawing a pattern of the newly expanded coding unit 1 according to the type of the coding point pattern and the type of the positioning point pattern selected; and step C9: detecting whether a coverage range of all current coding units 1 reaches a range to be coded of the plane coding target 8;

when the coverage range of all current coding units does not reach the range to be coded of the plane coding target, updating that n=n+1, and executing the step C5 to the step C8 again; and when the coverage range of all current coding units reaches the range to be coded of the plane coding target, completing the target generation step.

The range to be coded of the plane coding target 8 in the step C9 generally refers to an area. During specific coding, each coding unit 1 has a size, and then a range needed by the plane coding target 8 is finally determined. For a rectangular region, it is only necessary to respectively determine a length and a width of the area of the range to be coded.

The technical principles of the present invention are described above with reference to the specific embodiments. These descriptions are only for the purpose of explaining the principles of the present invention, and cannot be interpreted as limiting the scope of protection of the present invention in any way. Based on the explanation herein, those skilled in the art may think of other specific embodiments of the present invention without going through any creative work, which will all fall within the scope of protection of the present invention.

The invention claimed is:

1. A two-dimensional image splicing system for a plane coding target, comprising a data processing device, a first image acquisition device, a second image acquisition device, an acquisition device connecting bracket, a first XY motion platform, the plane coding target, a coding target fixing base, a second XY motion platform and a measured object fixing base, wherein:

the first image acquisition device is connected with the second image acquisition device through the acquisition device connecting bracket, the acquisition device connecting bracket is connected with the first XY motion platform, the first XY motion platform drives the acquisition device connecting bracket to move, and the first image acquisition device and the second image acquisition device are respectively in communication connection with the data processing device through a data transmission line;

the plane coding target covers an upper surface of the whole coding target fixing base, an upper surface of the measured object fixing base is used for placing and fixing a measured object, the coding target fixing base and the measured object fixing base are both fixed on the second XY motion platform, the second XY motion platform drives the coding target fixing base and the measured object fixing base to move synchronously, and the second XY motion platform is located below the first XY motion platform;

an optical axis direction of the first image acquisition device is parallel to an optical axis direction of the second image acquisition device, the optical axis direction of the first image acquisition device vertically points to the upper surface of the coding target fixing base, and the optical axis direction of the second image acquisition device vertically points to the upper surface of the measured object fixing base;

a motion plane of the first XY motion platform is perpendicular to the optical axis direction of the first image acquisition device; and a motion plane of the second XY motion platform, the motion plane of the first XY motion platform, the upper surface of the coding target fixing base and the upper surface of the measured object fixing base are parallel to each other.

2. The two-dimensional image splicing system for the plane coding target according to claim 1, wherein the plane coding target comprises a plurality of coding units distributed in an array, the coding unit comprises one central coding point, a plurality of normal coding points and at least one positioning point, a circular coded region of the coding unit is constructed by taking the central coding point as a center of circle and R as a construction radius, and the normal coding points are located in an interior or at an edge of the circular coded region;

the central coding point and any two normal coding points adjacent to the central coding point form a positioned region, any three adjacent normal coding points form a coded sub-region, the coded sub-region and the positioned region are equilateral triangles with equal areas, the positioning point is located in the positioned region, and only one positioning point is allowed to exist in each positioned region; and when the coding unit has only one positioning point, the positioning point is incapable of being located at a center-of-gravity location of the positioned region;

a coding unit coordinate system of the coding unit takes the central coding point as an original point, a direction towards one of the normal coding points adjacent to the central coding point is an X axis, and a direction perpendicular to the X axis is a Y axis;

the central coding point and the normal coding point are both provided with a coding point pattern, different coding point patterns are arranged on the central coding point and the normal coding point for coding, the coding point patterns have mutually different and unique coding numerical values, and the central coding point and the normal coding point both have mutually different and unique coding serial numbers;

a positioning point distribution style of the positioning point is used for determining coordinates of the central coding point and the normal coding point in the coding unit coordinate system; and the coding unit sequentially acquires the coding numerical values of the coding point patterns on the central coding point and the normal coding point according to the coding point serial numbers, and generates a coding numerical value sequence of the coding unit, and the coding units have mutually different and unique coding numerical value sequences.

3. The two-dimensional image splicing system for the plane coding target according to claim 2, wherein the coding unit respectively marks the unique coding serial numbers for the central coding point and each normal coding point according to a preset sampling sequence, and the coding serial numbers are 0 to K−1 respectively, wherein K is a total number of the central coding point and the normal coding points;

the coding numerical values of the coding point patterns are 0, 1, . . . , N−2 and N−1 respectively, wherein N is a number of types of the coding point patterns; and the coding unit sequentially acquires the coding numerical values of the coding point patterns on the central coding point and the normal coding point according to the coding point serial numbers as $V_0, V_1, \ldots, V_{K-2}$ and $V_{K-1}$ respectively, and generates the coding numerical value sequence of the coding unit as $[V_0, V_1, \ldots, V_{K-2}, V_{K-1}]$.

4. The two-dimensional image splicing system for the plane coding target according to claim 2, wherein M positioning point distribution styles are provided, serial numbers of the positioning point distribution styles are 0, 1, . . . , M−2 and M−1 respectively, and a number of positioning points contained in an $m^{th}$ positioning point distribution style is $K'_m$, wherein $0 \leq m \leq M-1$, $1 \leq K'_m \leq 6$, $m \in Z$ and $K'_m \in Z$;

the positioning points are numbered clockwise from the X axis of the coding unit coordinate system to obtain positioning point numbers of the positioning points as 0 to $K'_m-1$ respectively;

the positioning points are provided with the same positioning point pattern or different positioning point patterns;

when the positioning point patterns of the positioning points of the coding unit are the same, the positioning point patterns are used for determining the central coding point and the coding unit coordinate system;

when the positioning point patterns of the positioning points of the coding unit are different, the number of types of the positioning point patterns of the positioning points is defined as N', a unique pattern number is assigned to each positioning point pattern, and a value range of the pattern number is 0, 1, . . . , N'−2 and N'−1;

a verification numerical value of each positioning point is:

$$C_k = [(\Sigma_0^{K-1} V_i)/(N'^k)] \% N', \ 0 \leq k \leq K'_m - 1;$$

wherein, $C_k$ is a verification numerical value of a positioning point with a positioning point number k, a verification numerical value sequence of the coding unit is generated as $[C_0, \ldots, C_{K'_m-1}]$, and $V_i$ is each item in the coding numerical value sequence $[V_0, V_1, \ldots, V_{K-2}, V_{K-1}]$ of the coding unit;

when N'=1, the positioning point is only used for positioning the central coding point and the coding unit coordinate system; and the verification numerical value sequence of the coding unit is used in an identification stage for verifying the acquired coding numerical value sequence of the coding unit.

5. The two-dimensional image splicing system for the plane coding target according to claim 4, wherein a coding pattern of the plane coding target takes a generated coding unit coordinate system of a first coding unit as a reference coordinate system, and the coded region is expanded by continuously expanding a plurality of coding units to an adjacent uncoded region;

in the coding pattern of the plane coding target, the X axis of the coding unit coordinate system of each coding unit has the same orientation and is parallel to each other, and the Y axis of the coding unit coordinate system of each coding unit has the same orientation and is parallel to each other; and a numerical value sequence container is further comprised, the numerical value sequence container records coordinates of an expanded coding unit in the reference coordinate system and a coding numerical value sequence of the expanded coding unit, the numerical value sequence container contains a plurality of records, and each record stores coordinates in the reference coordinate system, a coding numerical value sequence, a serial number of a positioning point distribution style and a verification numerical value sequence of one coding unit.

6. The two-dimensional image splicing system for the plane coding target according to claim 4, wherein the coding point pattern and the positioning point pattern are both geometric shapes, various coding point patterns are different in at least one difference attribute, various positioning point patterns are different in at least one difference attribute, and the difference attribute comprises a shape, a size, a color and a transparency;

a side length of the coded sub-region and a side length of the positioned region are both L, and the side length L is no greater than the construction radius R; and the positioning point distribution styles of different coding units are the same or different, the positioning points of different positioning point distribution styles have different distribution locations relative to the central coding point, and numbers of the positioning points of different positioning point distribution styles are the same or different.

7. A splicing method of the two-dimensional image splicing system for the plane coding target according to any one of claim 1, comprising the following steps:

a target generation step: generating the corresponding plane coding target according to a measurement occasion requirement, and arranging the plane coding target on the upper surface of the coding target fixing base by the data processing device;

a coordinate system establishment step: respectively establishing a second XY motion platform coordinate system $O_p$-$X_p Y_p$ of the second XY motion platform, a first XY motion platform coordinate system $O'_p$-$X'_p Y'_p$ of the first XY motion platform, a plane coding target coordinate system $O_t$-$X_t Y_t$ of the plane coding target, a first image coordinate system $O$-$U_1 V_1$ of a first image acquired by the first image acquisition device and a second image coordinate system $O$-$U_2 V_2$ of a second image acquired by the second image acquisition device, and storing a spliced image coordinate system needed for image splicing by the data processing device;

a splicing original point setting step: moving a field of view of the first image acquisition device to a lower left corner region of the plane coding target through motions of the first XY motion platform and the second XY motion platform, then triggering the first image acquisition device and the second image acquisition device to acquire images at the same time, wherein a first sheet of first image and a first sheet of second image acquired form an image pair acquired for the $1^{st}$ time, and the first image needs to contain a pattern of at least one coding unit, then calculating coordinates $(x'_0, y'_0)$ of an image center of the first image in the image pair acquired for the $1^{st}$ time in the plane coding target coordinate system $O_t$-$X_t Y_t$, and arranging the second image in the image pair acquired for the $1^{st}$ at an original point in the spliced image coordinate system;

a splicing step: cooperating the first XY motion platform with the second XY motion platform to perform step scanning, triggering the first image acquisition device and the second image acquisition device to acquire images at the same time to obtain an image pair acquired for the $i^{th}$ time, wherein $i>1$ and $i \in Z$, then calculating coordinates $(x'_i, y'_i)$ of an image center of the first image in the image pair acquired for the $i^{th}$ time in the plane coding target coordinate system $O_t$-$X_t Y_t$, converting the coordinates $(x'_i, y'_i)$ into coordinates $(x''_i, y''_i)$ of the second image in the image pair acquired for the $i^{th}$ time in the spliced image coordinate system, and splicing the second image in the image pair acquired for the $i^{th}$ time to the coordinates $(x''_i, y''_i)$ in the spliced image coordinate system according to the coordinates $(x''_i, y''_i)$; and a judgment step: judging whether a currently spliced region reaches a range to be spliced:

when the currently spliced region reaches the range to be spliced, completing the splicing; and otherwise, updating that $i=i+1$, and repeatedly executing the splicing step until the currently spliced region reaches the range to be spliced.

8. The splicing method of the two-dimensional image splicing system for the plane coding target according to claim 7, wherein between the coordinate system establishment step and the splicing original point setting step, the splicing method further comprises a mounting deviation correction step of:

step A1: driving the coding target fixing base to move to a place below the field of view of the first image acquisition device through the motions the first XY motion platform and the second XY motion platform, and acquiring the first image of the plane coding target as a first corrected image by the first image acquisition device;

step A2: driving the coding target fixing base to move to a place below a field of view of the second image acquisition device through the second XY motion platform, and acquiring the second image of the plane coding target as a second corrected image by the second image acquisition device;

step A3: extracting a record of a certain coding unit in the first corrected image in the numerical value sequence container and establishing a first corrected image coordinate system of the first corrected image; and extracting a record of a certain coding unit in the second corrected image in the numerical value sequence container and establishing a second corrected image coordinate system of the second corrected image by the data processing device;

step A4: calculating an included angle $\beta_1$ between the first corrected image coordinate system and the plane coding target coordinate system $O_t$-$X_t Y_t$ and an included angle $\beta_2$ between the second corrected image coordinate system and the plane coding target coordinate system $O_t$-$X_t Y_t$ by the data processing device; and step A5: calibrating the first image acquisition device by acquiring pixel coordinates and actual physical coordinates of a central coding point or a normal coding point of a certain coding unit on the first corrected image to obtain a scale $\rho_1$ of the first image acquisition device; and calibrating the second image acquisition device by acquiring pixel coordinates and actual physical coordinates of a central coding point or a normal coding point of a certain coding unit on the second corrected image to obtain a scale $\rho_2$ of the second image acquisition device.

9. The splicing method of the two-dimensional image splicing system for the plane coding target according to claim 8, wherein the splicing step and the judgment step specifically comprise:

step B1: cooperating the first XY motion platform with the second XY motion platform for step scanning;

step B2: triggering the first image acquisition device and the second image acquisition device to acquire images at the same time to obtain the image pair acquired for the $i^{th}$ time, wherein $i>1$ and $i \in Z$;

step B3: extracting coordinates $(u_i, v_i)$ of a central coding point of a certain coding unit in the first image in the image pair acquired for the $i^{th}$ time in the first image coordinate system $O$-$U_1 V_1$, and extracting a record of the coding unit in the numerical value sequence container by the data processing device to obtain coordinates $(x_i, y_i)$ of the coding unit in the plane coding target coordinate system $O_t$-$X_t Y_t$; and calculating coordinates $(x'_i, y'_i)$ of an image center of the first image in the image pair acquired for the $i^{th}$ time in the plane coding target coordinate system $O_t$-$X_t Y_t$ as follows:

$$\left\{ \begin{bmatrix} x'_i \\ y'_i \end{bmatrix} = \rho_1 \begin{bmatrix} u_i \\ v_i \end{bmatrix} + \begin{bmatrix} x_i \\ y_i \end{bmatrix} \right\};$$

step B4: calculating coordinates $(x''_i, y''_i)$ of the second image in the image pair acquired for the $i^{th}$ time in the spliced image coordinate system as follows:

$$\begin{bmatrix} x''_i \\ y''_i \end{bmatrix} = \frac{1}{\rho_2} \begin{bmatrix} \cos(\beta_2) & -\sin(\beta_2) \\ \sin(\beta_2) & \cos(\beta_2) \end{bmatrix} \begin{bmatrix} x'_i - x'_0 \\ y'_i - y'_0 \end{bmatrix};$$

step B5: splicing the second image in the image pair acquired for the $i^{th}$ time to the coordinates $(x''_i, y''_i)$ of the spliced image coordinate system according to the coordinates $(x''_i, y''_i)$; and step B6: judging whether the currently spliced region reaches the range to be spliced:

when the currently spliced region reaches the range to be spliced, completing the splicing;

otherwise, updating that i=i+1, and repeatedly executing the steps B2 to B5 until the currently spliced region reaches the range to be spliced.

10. The splicing method of the two-dimensional image splicing system for the plane coding target according to claim 7, wherein the target generation step specifically comprises:

step C1: determining the side length L of the coding sub-region and the positioned region, the construction radius R, the types of the coding point patterns, the types of the positioning point patterns and the positioning point distribution styles;

step C2: constructing distribution of the central coding point and each normal coding point in the coding unit according to the construction radius R, and marking the central coding point and each normal coding point with the unique coding serial numbers respectively according to a preset sampling sequence;

step C3: selecting the positioning point distribution style as a serial number $m_0$, generating the first coding unit, acquiring the coding numerical value sequence $[V_{0,0}, V_{0,1}, \ldots, V_{0,K-2}, V_{0,K-1}]$ and the verification numerical value sequence $[C_{0,0}, \ldots, C_{0,K'm0-1}]$ of the first coding unit, and setting reference coordinates of the plane coding target coordinate system $O_t$-$X_tY_t$ in the coding unit coordinate system of the first coding unit;

step C4: recording and storing coordinates $(x_0, y_0)$ of the first coding unit in the plane coding target coordinate system $O_t$-$X_tY_t$, the coding numerical value sequence $[V_{0,0}, V_{0,1}, \ldots, V_{0,K-2}, V_{0,K-1}]$, the serial number $m_0$ of the positioning point distribution style and the verification numerical value sequence $[C_{0,0}, \ldots, C_{0,K'm0-1}]$ by the numerical value sequence container, and then drawing a pattern of the first coding unit according to the type of the coding point pattern and the type of the positioning point pattern selected;

step C5: expanding other coding units to an adjacent uncoded region to expand the coded region, and selecting the positioning point distribution style as a serial number $m_n$, wherein $0 \leq m_n \leq M-1$;

step C6: respectively generating corresponding coding numerical values for a central coding point and each normal coding point of a newly expanded coding unit to form a coding numerical value sequence $[V_{n,0}, V_{n,1}, \ldots, V_{n,K-2}, V_{n,K-1}]$ of the newly expanded coding unit;

step C7: detecting whether the coding numerical value sequence $[V_{n,0}, V_{n,1}, \ldots, V_{n,K-2}, V_{n,K-1}]$ is unique in the numerical value sequence container:

when the coding numerical value sequence $[V_{n,0}, V_{n,1}, \ldots, V_{n,K-2}, V_{n,K-1}]$ is unique in the numerical value sequence container, executing the step C8, and otherwise, executing the step C6;

step C8: calculating a verification numerical value sequence $[C_{n,0}, \ldots, C_{n,K'm0-1}]$ of the newly expanded coding unit, then recording and storing coordinates $(x_n, y_n)$ of the newly expanded coding unit in the plane coding target coordinate system $O_t$-$X_tY_t$, the coding numerical value sequence $[V_{n,0}, V_{n,1}, \ldots, V_{n,K-2}, V_{n,K-1}]$, the serial number $m_n$ of the positioning point distribution style and the verification numerical value sequence $[C_{n,0}, \ldots, C_{n,K'm0-1}]$ by the numerical value sequence container, and then drawing a pattern of the newly expanded coding unit according to the type of the coding point pattern and the type of the positioning point pattern selected; and step C9: detecting whether a coverage range of all current coding units reaches a range to be coded of the plane coding target;

when the coverage range of all current coding units does not reach the range to be coded of the plane coding target, updating that n=n+1, and executing the step C5 to the step C8 again; and when the coverage range of all current coding units reaches the range to be coded of the plane coding target, completing the target generation step.

* * * * *